(12) United States Patent  (10) Patent No.: US 8,744,966 B1
Amacker et al.  (45) Date of Patent: Jun. 3, 2014

(54) REAL-TIME MOBILE WALLET SERVER

(71) Applicant: Amazon Technologies, Inc., Reno, NV (US)

(72) Inventors: Matthew W. Amacker, San Jose, CA (US); Philip Yuen, Seattle, WA (US); Diwakar Gupta, Seattle, WA (US); Chih-Jen Huang, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/829,070

(22) Filed: Mar. 14, 2013

Related U.S. Application Data

(62) Division of application No. 12/434,487, filed on May 1, 2009, now Pat. No. 8,423,462.

(51) Int. Cl.
*G06Q 40/00* (2012.01)
*G06Q 20/36* (2012.01)
*G06Q 20/32* (2012.01)

(52) U.S. Cl.
CPC ............... *G06Q 20/36* (2013.01); *G06Q 20/32* (2013.01); *G06Q 20/325* (2013.01)
USPC .............................................. 705/41; 705/35

(58) Field of Classification Search
CPC ...... G06Q 20/325; G06Q 20/36; G06Q 20/32
USPC ............................................. 705/77, 30, 41
See application file for complete search history.

(56) References Cited

U.S. PATENT DOCUMENTS

| | | | |
|---|---|---|---|
| 2002/0077993 A1* | 6/2002 | Immonen et al. | 705/77 |
| 2008/0270301 A1* | 10/2008 | Jones et al. | 705/41 |
| 2009/0012878 A1 | 1/2009 | Tedesco et al. | |
| 2009/0063312 A1* | 3/2009 | Hurst | 705/30 |

OTHER PUBLICATIONS

U.S. Appl. No. 12/434,487, filed May 1, 2009, Matthew W. Amacker, "Real-Time Mobile Wallet Server".
"Firethorn", retrieved on Mar. 9, 2009 at http:\\www.firethornmobile.com, 1 pgs.
"mFoundy, The Leading Mobile Platform for Financial Services", retrieved on Mar. 9, 2009 at http:\\www.mfoundry.com/index.html, 1 pgs.
"Near Field Communication", Wikipedia, retrieved on Mar. 9, 2009 at http:\\en.wikipedia.org/wiki/Near_Field_Communication, 8 pgs.

(Continued)

*Primary Examiner* — Samica L Norman
(74) *Attorney, Agent, or Firm* — Lee & Hayes, PLLC

(57) ABSTRACT

Techniques and apparatuses for providing wallet server information to an entity using a real-time mobile wallet server (MWS) are disclosed herein. The MWS may receive a request for personal information from an entity. The MWS may then display to a user a summary of the request, a list of selections available in the wallet server that may satisfy the request, and a list of selectable response options for the user to choose to respond to the entity. In some aspects, the wallet server may store username and associated passwords, payment information, and/or contact information. In further aspects, the MWS may generate limited-use payment information associated with existing payment information. The MWS may communicate ad hoc messaging to the entity using voice-based or real-time text-based communications over an established communication link between the MWS and entity.

20 Claims, 9 Drawing Sheets

(56) References Cited

OTHER PUBLICATIONS

Non-Final Office Action for U.S. Appl. 12/434,487, mailed on Nov. 3, 2011, Matthew Amacker, "Real-Time Mobile Wallet Server", 9 pages.

Final Office Action for U.S. Appl. 12/434,487, mailed on May 23, 2012, Matthew Amacker et al., "Real-Time Mobile Wallet Server", 11 pages.

"Thumbplay", retrieved on Apr. 14, 2009 at http:\\www.thumplay.com/about/home.do, 1 pg.

* cited by examiner

REAL-TIME MOBILE WALLET SERVER

CROSS REFERENCE TO RELATED PATENT APPLICATION

This application is a divisional application of and claims a benefit and priority from U.S. patent application Ser. No. 12/434,487, titled "Real-Time Mobile Wallet Server," filed on May 1, 2009, which is herein incorporated by reference.

BACKGROUND

A person typically carries many items containing personal information with oneself during a normal day. For example, a person often carries a driver's license, payment cards, insurance cards, or other documents that contain information that is private and personal to a holder. In addition, a person often has some amount of personal information that is memorized, such as login usernames, passwords, addresses, telephone numbers, and so forth. In most cases, a person prefers to have close control over distribution of these items and/or the information that comprises these items.

When a person conveys personal information to another, they often have to physically transfer an item (e.g., payment card for swiping at a cash register, etc.) or electronically transfer information from the item (e.g., type in payment card number into web-based form, etc.). These processes may be time consuming, increase the chance of privacy loss of the information, and/or may require the person to organize many disparate pieces of information.

One particular challenge in today's society is having the ability to keep personal information private. For example, a person may not want to physically provide her payment card to another person (e.g., cashier, agent, etc.), but instead may prefer to swipe her card at a customer kiosk to complete a transaction. In another example, a person may choose not to establish an electronic account with an entity (e.g., online retailer) who stores the person's user information (e.g., username, password, address, payment information, etc.) because of a fear of a potential loss of privacy to the entity, a hacker, or a third party.

In some situations, meanwhile, a person may desire to allow others to use his personal information. For example, a parent may desire to allow a child or spouse to make a purchase with the parent's payment card. In such instances, the parent may want to limit any possible exposure of his personal information by maintaining control of the personal information to the extent possible while enabling the child or spouse (or other approved person) to proceed with a use of the parent's personal information.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, a person may possess many pieces of personal information and/or personal items, which may include physical items (e.g., payment cards, etc.) and memorized information (e.g., usernames and associated passwords, etc.). It may be desirable for a person to store this information locally, such as on a mobile device that the person owns and physically controls (e.g., a mobile telephone, a PDA (personal digital assistant), an electronic organizer, a portable computer, etc.). For example, the person may store personal information in a wallet server stored in a mobile wallet server device. The mobile wallet server device may be a computing device that enables real-time two-way communication with a second computing device.

It may be desirable for the person to initiate a request to another entity, such as a retailer, to facilitate secure transfer of the personal information stored on the mobile wallet server. For example, the entity may be directed to communicate with the mobile wallet server to obtain payment information and/or personal information associated with the person controlling the mobile wallet server. The person may then control the distribution of personal/payment information after a self-initiated request by selectively approving or rejecting requests for personal information using the mobile wallet server.

In an example, the person may initiate a purchase of an item from a retailer by communicating the person's mobile device identifier (e.g., a telephone number, an IP address, an alias, etc.). The retailer may then transmit a request to the person's mobile device using the identifier, which in turn may present response options to the person. The person may respond to the request by interacting with the mobile wallet server (e.g., select "accept" or "reject" button, etc.) using a user interface of an application that is triggered (executed) upon receipt of the request from the entity. Upon a selection of "accept" (or similar approval), the mobile wallet server may transmit the requested information (e.g., personal/payment information, etc.) to the retailer to complete a pending process. In this way, the person may complete a complicated transaction, such as a purchase and delivery setup of a home appliance, by transmitting payment and personal information (e.g., address, contact information, etc.) to the retailer via a real-time mobile wallet server while avoiding timely manual entry of the information and while reducing dissemination of the personal information to additional storage locations (e.g., an entity server used to store personal account information).

The process and systems described herein may be implemented in a number of ways. Example implementations are provided below with reference to the following figures.

Illustrative Environment

Figure 1:
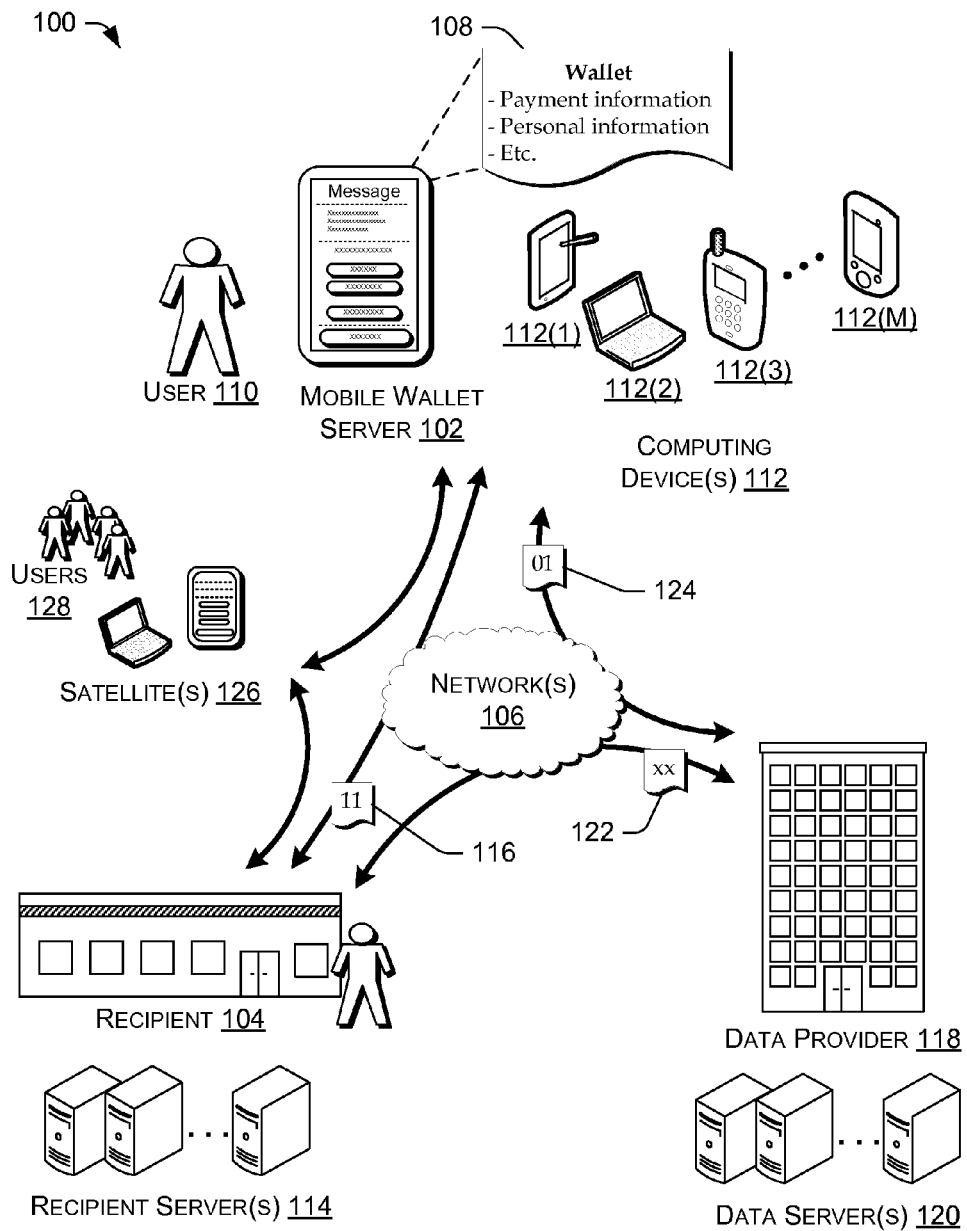
FIG. 1 is a schematic diagram of an illustrative environment that includes various entities that may exchange information with a real-time mobile wallet server.

FIG. 1 is a schematic diagram of an illustrative environment 100 that includes various entities that may exchange information with a real-time mobile wallet server 102. In some embodiments, the mobile wallet server (or "MWS") 102 may provide information with a recipient 104. For example, the MWS may be used to provide the recipient 104 with payment in response to an information request. An exchange of information may occur during a transaction that is carried out over one or more networks 106.

In accordance with various embodiments, the mobile wallet server 102 hosts a wallet server ("wallet") 108. The wallet 108 may store, without limitation, payment information, personal information, or other data that a user 110 may desire to store in a central repository and/or provide to another person or entity. For example, the wallet 108 may enable the user 110 to securely store payment card information, access request information (e.g., usernames and associated passwords), contact information (user's phone number, address, etc.), and so forth. In addition, the wallet 108 may enable the user 110 to transmit data from the wallet to trusted recipients, such as the recipient 104. The wallet 108 may include various security features that may prevent unauthorized access to the wallet by a third party. For example, access to the wallet 108 may protected by passwords, biometrics (e.g., fingerprint reader, etc.), and so forth. Transmission of the personal information may be protected via encryption, limited use payment information, or other techniques for securely transmitting data between two or more servers.

The MWS 102 may be any computing device capable of storing and processing data. For example, the MWS 102 may be a mobile server that is configured to operate on a smart telephone platform or other mobile computing device platform. The MWS 102 may be configured to communicate with other entities (e.g., the recipient 104, etc.) via one or more communication types using radio waves and/or optical communications such as mobile telephone communications, Wi-Fi, Bluetooth®, NFC (near field communications), infrared, and so forth. As such, the MWS 102 may receive/transmit signals with the recipient 104 to selectively exchange information stored in the wallet 108.

The user 110 may use the MWS 102 and/or computing device(s) 112 to interact with the recipient 104. The computing device(s) 112 may include network-enabled devices that may communicate, via the network(s) 106, with the recipient. The computing device(s) 112 may include, for example, a tablet computer 112(1), a desktop/mobile computer 112(2), a personal digital assistant (PDA) 112(3), smart phones 112(M), and so forth. For example, the user 110 may initiate a transaction with the recipient 104 via the computing device 112 (e.g., the mobile computer 112(2)) by accessing an e-commerce website hosted by recipient server(s) 114 of the recipient. The user 110 may direct the recipient server(s) 114 to communicate with the MWS 102 to exchange information from the wallet 108 with the recipient server(s), such as payment information. In some embodiments, the user 110 may transmit a MWS identifier associated with the MWS 102 to the recipient server(s) 114 to enable the recipient servers to establish a communication link with the MWS. Upon receipt of a request (via the MWS 102) from the recipient 104, the user 110 may make one or more selections using the MWS to determine a response to the request. The response may include an acceptance and transmittal of information (personal/payment information, etc.) or a rejection of the request.

As discussed above, the recipient 104 may communicate with the MWS 102 using one or more recipient server(s) 114. For example, the recipient server(s) 114 may host a POS (point of sale) transaction system that may communicate directly with the MWS 102 to exchange information. Using the MWS 102, the user 110 may transmit personal information from the wallet 108 to the recipient server(s) 114. For example, the recipient server(s) 114 may exchange data 116 via the network 106. The data 116 may include a request transmitted from the recipient server(s) 114 to the MWS 102 via the network 106. A response may be returned to the recipient server(s) from the MWS in the form of an approval that includes associated personal information from the wallet 108. In the alternative, the user 110 may optionally reject the request from the recipient server(s) 114 and not disperse personal information from the wallet 108.

In addition or in the alternative, the recipient server(s) may host a page that may collect personal information from the user 110, such as personal information that the user 110 stores in the wallet 108. For example, the page may include data forms for collecting personal data such as payment information, contact information, etc. In some instances, the personal information transmitted from the MWS 102 may be used to populate the data form(s) provided on the page, thus enabling fulfillment of the information without manual data input of the personal information.

In some embodiments, a data provider 118 may be in communication with the MWS 102 and/or the recipient server(s) 114 via data server(s) 120. The data provider 118 may be associated with information stored in the wallet 108 of the MWS 102. For example, the data provider 118 may be a financial institution that issues payment card information to the user 110, which is stored in the wallet 108. The data provider 118 may fulfill a payment 122 via a data exchange between the recipient server(s) 114 and the data server(s) 120 upon an approval from the MWS 102. In various embodiments, the MWS 102 may exchange data 124 with the data server(s) 120 such as to update payment information or to exchange limited-use payment information (e.g., one-time payment number, etc.).

In further embodiments, one or more satellites 126 may be in communication with the MWS 102 and/or the recipient server(s) 114. The satellites 126 may be operated by users 128 that are associated with the user 110. The users 128 may be family members, associates, or other people that the user 110 may approve to use personal information from the wallet 108. For example, the users 128, via the satellites 126, may generate a request for personal information (e.g., payment information) from the wallet 108 by providing the recipient server(s) 114 with a MWS identifier. The recipient 104 may use the MWS identifier to transmit an approval request to the MWS 102 that may ultimately enable the user 110 to selectively approve/reject the request initiated by the users 128. In this way, the users 128 may request payments or dispersion of other personal information from the user 110 via the MWS 102 without controlling the MWS. In another example, the satellites 126 may communicate with the MWS 102 directly to receive personal information stored in the wallet 108, which may then be provided to the recipient 104.

Illustrative Operation

Figure 2:
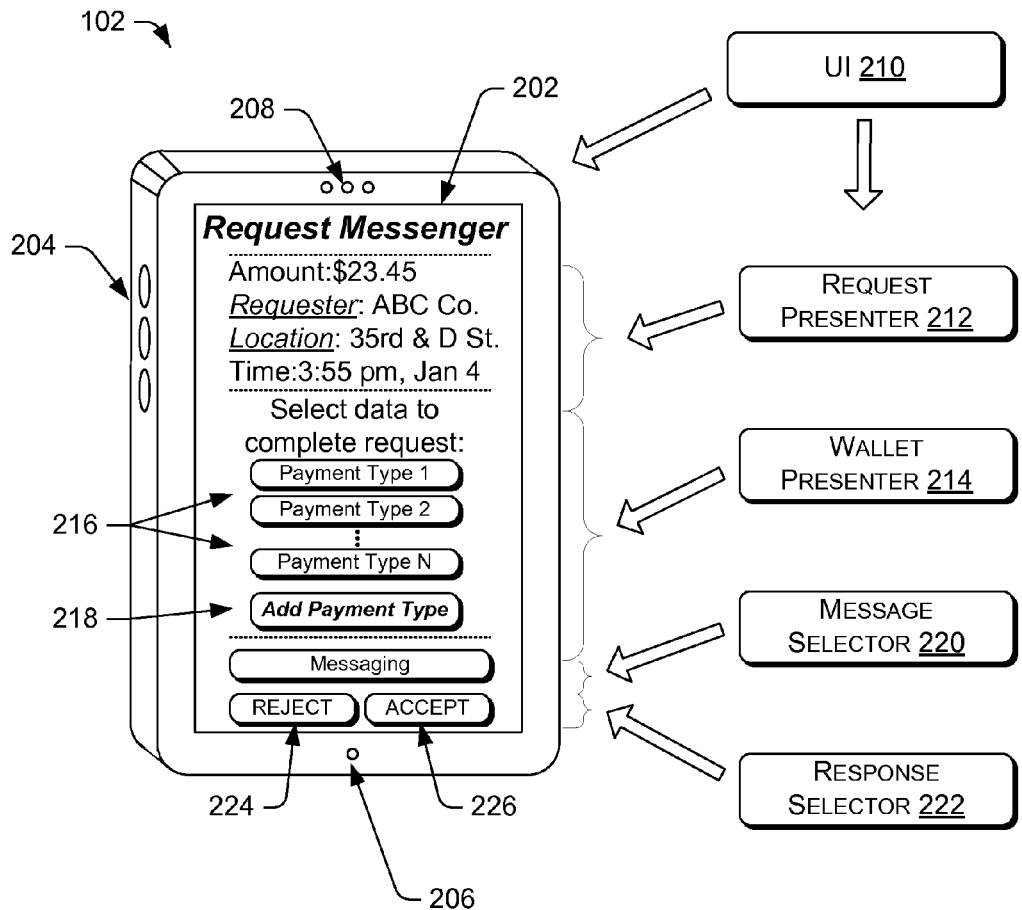
FIG. 2 is a schematic diagram of an illustrative mobile wallet server that may be used to provide real-time information from a wallet.

FIG. 2 is a schematic diagram of an illustrative mobile wallet server ("MWS") 102 that may be used to provide real-time information from a wallet. In some embodiments, the MWS 102 is equipped with a display 202 to present information to the user 110. The MWS 102 may also include various controls 204 to enable manipulation of the MWS such as to input data, adjust settings, or for other purposes. In some embodiments, the display 202 may be a touch screen display that enables the user to interact with the MWS by touching portions of the display to input or manipulate data. The MWS 102 may also include a microphone 206 and speakers 208 to receive voice communications and emit sound, respectively. The MWS 102 includes communication hardware to enable the MWS to communicate with remote entities (e.g., the recipient 104 of FIG. 1, etc.) using one or more communication types such as radio wave communications and optical communications.

The MWS 102 is shown with an example user interface (UI) 210 to display at least a portion of relevant data to the user 110. In some embodiments, the UI 210 may include a first portion having a request presenter 212 to identify information related to a request. For example, after the user 110 may provide a MWS identifier to the recipient 104, the recipient may send a request for information to the MWS 102. The request presenter 212 may present information such as a type of request (payment, contact information, username, etc.), a requester's identity/location, a time of the request, an amount (if applicable) and/or other relevant information that may assist the user to understand the request. In some embodiments, the request presenter 212 may also present a request initiation source as from one of the users 128, via the satellites 126, which may initiate a request through the recipient 104. For example, the request presenter 212 may present, among other information, "requester: ABC Company, via your son".

A second section of the UI 210 may include a wallet presenter 214 to enable the user to view and/or select information 216 that may be transmitted in response to the request received by the MWS 102. In some embodiments, the wallet presenter 214 may enable the user 110 to select any available information in the wallet 108. In other embodiments, the wallet presenter 214 may present information that is relevant to the request received by the MWS 102, which may then be selected by the user 110. For example, the user 110 may highlight (select) information as a payment type (or other personal information shown in the wallet presenter 214) that the user desires to share with the requester in response to the request.

In an example presentation, when the MWS 102 receives a payment request, the wallet presenter 214 may present relevant payment options that may be used to respond to the payment request (e.g., payment card selections, etc.). In another example presentation, the wallet presenter 214 may present address selections when the request is for contact information of the user 110. In still another example presentation, the wallet presenter 214 may present username and associated passwords (or representations thereof) that may be used to respond to an access (e.g., username/password) request that is received by the MWS 102.

In various embodiments, the wallet presenter 214 may enable the user 110 to make an ad hoc entry of personal information in response to the request via an input button 218. For example, the user 110 may want to respond to a request with information that is not yet included in the wallet 108, and thus not presented by the wallet presenter 214. The user 110 may select the input button 218, enter relevant personal information, and then selectively save the inputted information.

A third section of the UI 210 may include a message selector 220. The message selector may be used to communicate with the requester (e.g., the recipient 104, etc.). The message selector may enable the user 110 to communicate with the requester using voice or text communications, such as to inquire about a request, provide additional information, or for other reasons. For example, the user 110 may receive a request from the recipient 104. The user 110 may then desire to discuss an aspect of the request with the recipient 104, which may be facilitated by selecting the message selector 220. The message selector 220 may then enable the user 110 to communicate with the recipient using any of the various communication types available to the MWS, such as an voice communication (e.g., mobile telephone call, voice over Internet protocol (VoIP), etc.) or a text-based communication (e.g., a simple message service (SMS) text message, an email, an instant message (IM), etc.). In some embodiments, the message selector 220 may enable the user 110 to communicate with the users 128 via the satellites 126 to discuss a request initiated by one of the satellites 126.

A fourth portion of the UI 210 may include a response selector 222. The response selector 222 may enable the user 110 to response to the request shown by the request presenter 212. In some embodiments, the response selector 222 may include a reject option 224 and an accept option 226. The reject option 224, when selected by the user 110, may initiate a rejection communication to the requester, and may not provide personal information to fulfill the request. The accept option 226, when selected by the user 110, may initiate an acceptance communication to the requester, and may provide the selected personal information from the wallet presenter 214 to fulfill the request.

Figure 3:
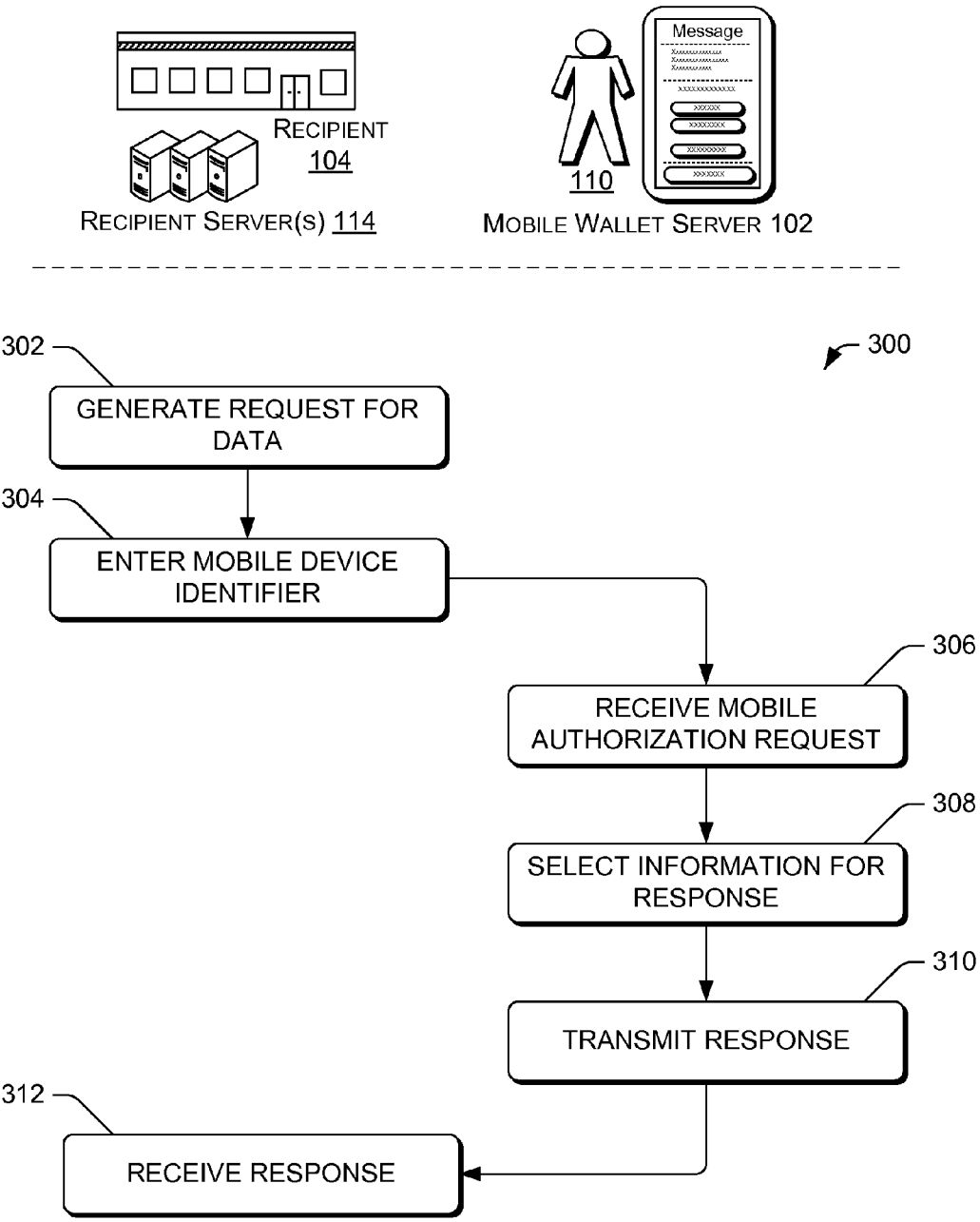
FIG. 3 is a flow diagram of an illustrative process of providing information from a wallet using a mobile wallet server.

FIG. 3 is a flow diagram of an illustrative process 300 of providing information to an entity from the wallet 108 using a mobile wallet server 102. The process 300 is organized to depict the entity (the recipient server(s) 114 or the MWS 102) that is most likely to participate in the described operation.

The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly.

At 302, the recipient server(s) 114 may generate a request for information, such as personal information that the user 110 may have stored in the wallet 108. For example, the user 110 may interact with the recipient 104 during a transaction (e.g., in person, over a telephone, via a user interface displayed by a computing device, etc.). The recipient may require personal information from the user 110 to complete the transaction, such as payment information, contact information, or other information that may be stored in the wallet 108. In another example, the recipient may require a login username and password from the user 110, which the user may store in the wallet 108.

At 304, the recipient server(s) 114 may receive a MWS identifier (e.g., a mobile telephone number, IP address, etc.) provided by the user (or another source such as the users 128 via the satellites 126). The MWS identifier may enable the recipient server(s) 114 to transmit a request to the MWS 102.

At 306, the MWS 102 may receive a request for the personal information from the recipient server(s) 114. The MWS 102 may be perpetually listening to obtain the received request from the recipient 104. The request may include information such as the type of request (payment, contact information, username, etc.), and the requester's identity and/or location, and other relevant information (e.g., payment amount, time of request, etc.).

At 308, the user 110 may optionally select personal information presented by the wallet presenter 214 from personal information stored in wallet 108. The personal information may be selected for later transmission to the recipient 104 via the recipient server(s) 114. In some instances, the user 110 may not select personal information such as when the user 110 receives a fraudulent request that was initiated by a third party unrelated to the user, or for other reasons.

In various embodiments, the wallet 108 may automatically select personal information to respond to the request at the operation 306. The selected personal information may be a unique identifier that is transmitted by the MWS 102 to the recipient server(s) 114 in lieu of a username and password or other access information. The user 110 may register the unique identifier with the recipient 104 and associate a username and password with the unique identifier to enable the user to access to a restricted resource of the recipient using the unique identifier. The unique identifier may uniquely identify the MWS 102 and/or the wallet 108, thus identifying the user 110 in lieu of a user submission of access information (username/password, etc.) to the recipient 104.

In some embodiments, at 308, personal information in the wallet may be automatically selected for a user based on the type of the request. For example, when the request is for contact information of the user, the operation 308 may automatically select the user's address and telephone number that is stored in the wallet. Similarly, payment information, username and password information, or other types of personal information may be automatically selected when it is identified as corresponding to the type of the request that is received at 306.

At 310, the MWS 102 may transmit a response to the recipient server(s) 114. For example, the response may include an approval of a request and selection of personal information stored in the wallet 108. Alternatively, the response may include a rejection and may not include information stored in the wallet 108. In some embodiments, the response may include a request to communicate with the recipient 104 using the message selector 220.

Finally, at 312, the recipient may receive the response from the MWS 102. The response may complete the process of the request for data at the operation 302, such as the request for payment information, username/password, contact information, etc. In some embodiments, the recipient 104 may use the received response to complete a data form, such as a data form made available on a page available via the Internet or other network of computers.

Illustrative Mobile Wallet Server

Figure 4:
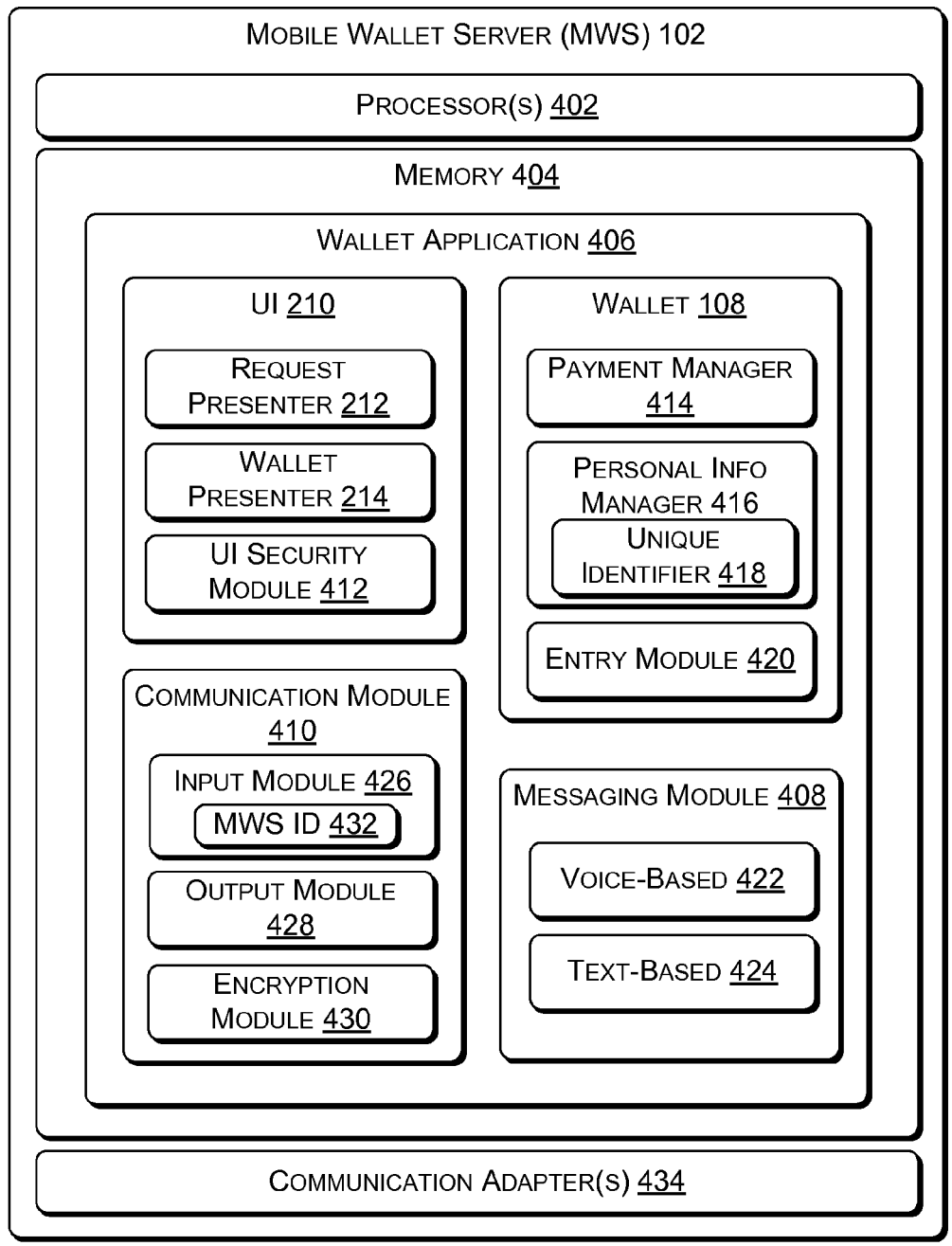
FIG. 4 is a block diagram of an illustrative mobile wallet server showing one or more embodiments of components that may provide real-time personal information.

FIG. 4 is a block diagram of the illustrative mobile wallet server 102 showing one or more embodiments of components that may provide real-time personal information. The mobile wallet server 102 may include one or more processor(s) 402 and memory 404. The memory may be used to store instructions that, when executed by the processor(s) 402, cause the processor(s) to perform at least a portion of the processes described herein. The instructions may be stored in the memory 404 in the form of various components, modules, or other types of instructions that facilitate the processes described herein.

In accordance with some embodiments, the memory 404 may be used to store a wallet application 406. The wallet application 406 may include various components to receive requests, provide information to the user 110, access and manipulate personal information stored in the wallet 108, and communicate responses. The various components may include the user interface module (UI) 210. The wallet 108, a messaging module 408, and a communication module 410.

The UI 210 may include the request presenter 212, the wallet presenter 214, and a UI security module 412. As described above, the request presenter 212 may present information related to a request. For example, the request presenter 212 may present information such as a type of request (payment, contact information, username, etc.), a requester's identity/location, a time of the request, an amount (if applicable) and/or other relevant information that may assist the user to understand the request.

The wallet presenter 214 may enable the user to view and/or select information that is stored in the wallet 108. In some embodiments, the wallet presenter 214 may provide access to all of the data in the wallet or a portion of the information of the wallet, such as the information that is relevant to the request received at the operation 306 in the process 300. The wallet selector 214 may enable the user 110 to select information in the wallet 108 that may be used in a response via the operation 310 of the process 300.

A UI security module 412 may prevent unauthorized access to information provided by the MWS 102. For example, the UI security module 412 may require the user 110 to provide text, audio, biometric, or other information before accessing the wallet 108 or other data via the UI 210.

The wallet 108 may also include a payment manager 414, a personal information manager 416, and an entry module 420. The payment manager 414 may classify information in the wallet 108 as payment information, such as bank payment information (e.g. credit/debit card numbers, gift cards numbers, etc.). In some embodiments, the payment manager 414 may determine limited-use information for a payment type. The payment manager 414 may periodically contact the data provider 118 (during or outside of the process 300) to establish limited-use (e.g., one-time payment, etc.). In this way, the payment manager 414 may store information in the wallet 108 that includes a payment type, a payment number, and a limited-use payment number for a particular payment item.

The personal information manager 416 may classify information in the wallet 108 as contact information, such as username/passwords, contact information, or other personal information (e.g., frequent purchase program numbers, etc.). The personal information may assign data to fields, which may be used to fulfill a request of information. For example, the recipient 104 may request the user's house number and street. A response may then be generated that only provides the information requested (house number and street) rather than an entire address including a city, state, zip, country, etc. In some embodiments, the personal information manager may be used to store a unique identifier 418 that, when registered with the recipient 104, may enable user access to a restricted resource of the recipient in lieu of a username/password or other access information.

The entry module 420 may be used to input, manipulate, or remove data from the wallet 108. For example, the entry module 420 may enable the user 110 to input information in the wallet using the input button 218 to add or update payment information to respond to a request.

The messaging module 408 may include a voice-based communication module 422 and a text-based communication module 424. The voice-based communication module 422 may enable the user 110 to communicate with another entity, such as one or more of the users 128 via the satellites 126 or the recipient 104 using a voice-based communication. Voice-based communications may be conducted using a wired or wireless telephone network, a computer network (e.g., VoIP, etc.), or other methods to facilitate voice-based communications. For example, when the user receives a request from the recipient 104, the MWS 102 may establish a VoIP voice-based communication using an IP address provided by the recipient 104 and used to establish the communication between the recipient and the MWS.

Similar to the voice-based communication module, The text-based communication module 424 may enable the user 110 to communicate with another entity, using a texted-based communication such as an email, IM, text message (SMS, etc.), and so forth. Voice-based communications may be conducted using a wired or wireless telephone network, a computer network, or other methods to facilitate text-based communications.

The communication module 410 may include an input module 426, an output module 428, and an encryption module 430. The input module 426 may receive the response at the operation 306 of the process 300. For example, the input module 426 may enable the MWS 102 to receive real-time requests, such as via a communication using an IP address of the MWS 102, which may enable the user 110 to provide approval/rejection of the request with minimal delay. The input module 426 may include a MWS identifier 432 such as a mobile telephone number, IP address, or other identifier that may be used to establish a communication with the MWS 102.

The output module 428 may enable the MWS 102 to output information such as the approval/rejection, personal information, etc. to the recipient 104 or another entity (the data provider 118, the users 128, etc.). For example, the output module 428 may communicate with the entity submitting the request at the operation 306 using the same communication type or by establishing a second communication type (e.g., a call back, reconnect, etc.).

The encryption module 430 may establish and use encryption for incoming and outgoing communications with an entity. For example, the encryption module 430 operate in conjunction with the input module 426 and the output module 428 to encrypt/decrypt personal data and thus protect the user's personal information from being obtained (and understood) by an unauthorized party.

The MWS 102 may include one or more communication adapter(s) 434. The communication adapter(s) 434 may be used to connect the MWS 102 with another entity (the recipient 104 via the recipient server(s) 114, etc.) using an available communication type such as mobile telephone, computer networking using an IP address, NFC (near field communications), Bluetooth®, Wi-Fi, or any other wired or wireless communication type.

Additional Embodiments

Figure 5:
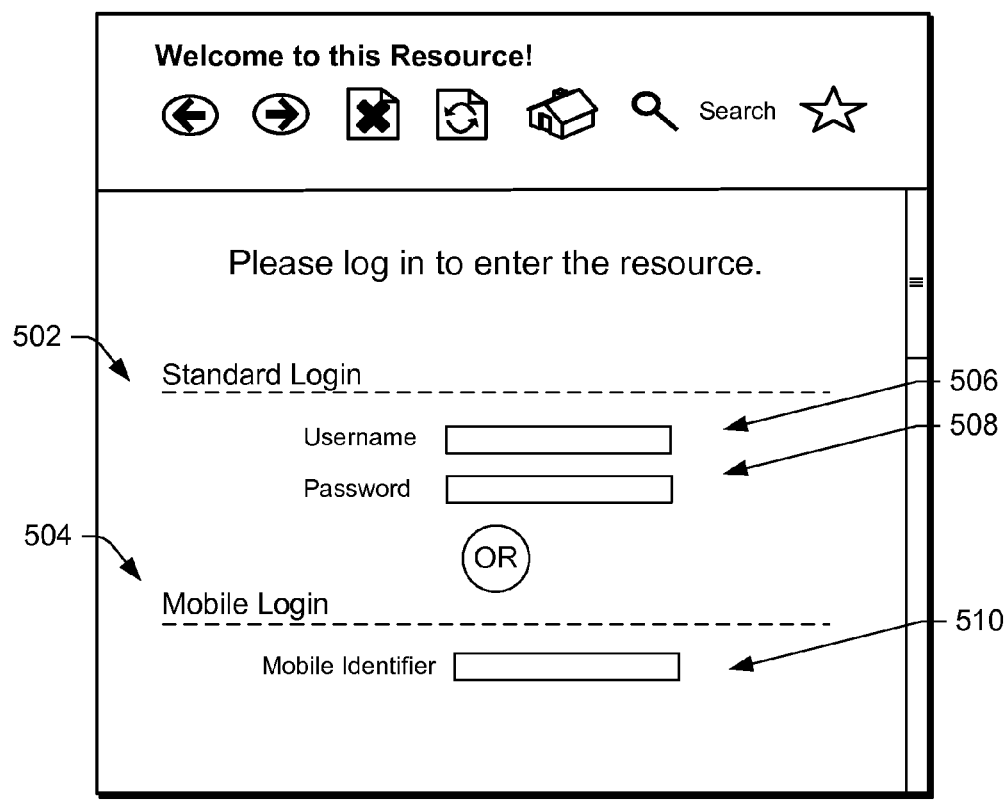
FIG. 5 is an illustrative login page that may enable a user to login or gain access to a resource or another page.

FIG. 5 is an illustrative login page 500 that may enable a user to login or gain access to a resource or another page. The page 500 may include a standard login section 502 and a mobile login section 504. The standard login section 502 may include input fields for a user (such as the user 110) to input appropriate personal/payment information for receipt by an entity (e.g., the recipient server(s) 114). The input fields may include a username field 506 and a password field 508, however more or fewer fields may also be included in the mobile login section.

Often, people have trouble managing their username/passwords when they use many different username/password combinations for various websites or other systems in order to protect their personal data. Unfortunately, this approach may lead to instances where the user forgets his username/password combination or does not immediately recall the exact combination to enable a quick input in the standard login section 502. Thus, the user 110 may enter the MWS identifier 432 in a mobile identifier field 510, which may initiate the process 300 as described with reference to the operation 304. For example, the user 110 may enter a mobile telephone number of the MWS 102 as the MWS identifier, which may be used to send a request to the MWS via the recipient server(s) 114.

In some embodiments, the MWS identifier 432 may be converted from a first type that is provided to the recipient to a second type that is used to connect with the MWS 102. For example, when the MWS identifier 432 of a telephone number is provided to the recipient 104, the telephone number may be converted to an IP address prior to establishing a communication with the MWS 102. For example, the conversion may include using a lookup table to convert a mobile telephone number to a currently assigned IP address (or vice versa, etc.), such as a lookup table hosted on a central database. Other types of MWS identifier conversions are also contemplated to facilitate establishing a communication link between the MWS 102 and the recipient 104.

Figure 6:
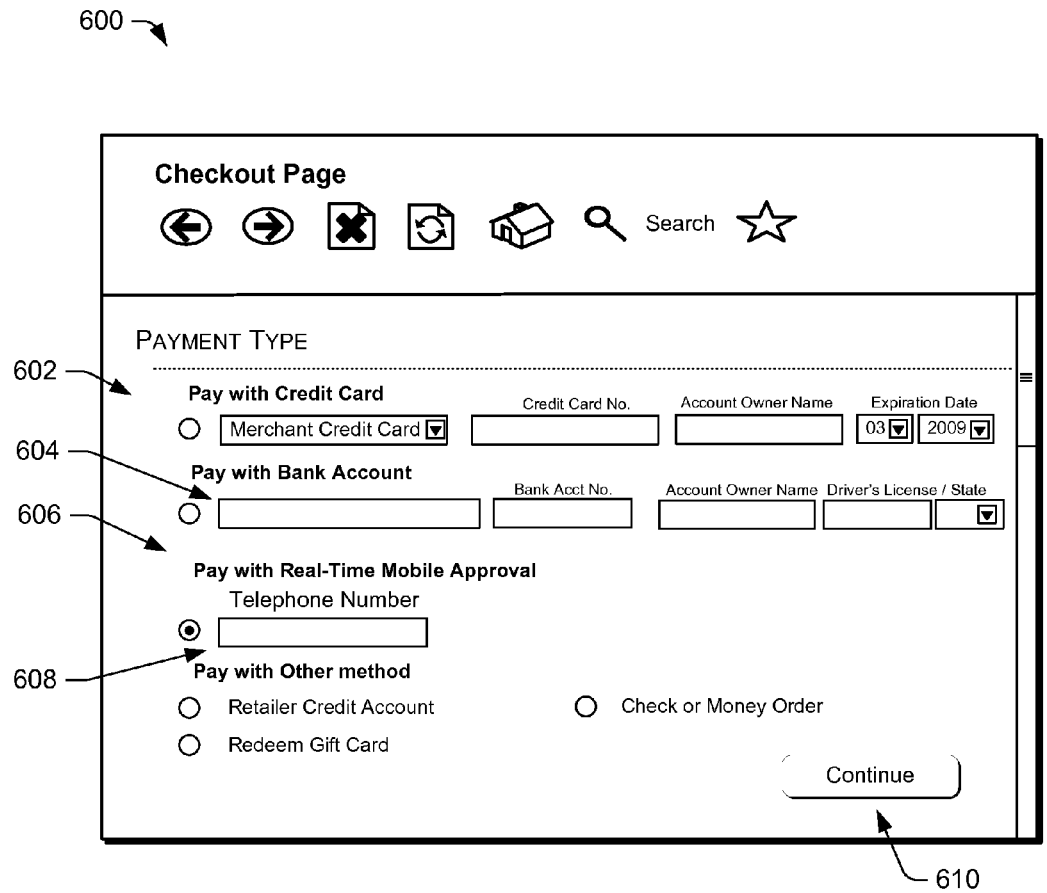
FIG. 6 is an illustrative payment page that may enable a user to submit payment information via the mobile wallet server to an entity.

FIG. 6 is an illustrative payment page 600 that may enable a user to submit payment information via the MWS 102 to an entity such as the recipient 104. The payment page 600 may be served to the user 110 at the operation 302 of the process 300. The payment page 600 may include different types of payment options, such as a credit card payment section 602, a bank account payment section 604, or other traditional payment sections that include fields to enable the user 110 to input appropriate personal information thereon. The payment page 600 may also include a real-time mobile approval section 606 to enable the user 110 to provide the MWS identifier 432 (e.g., mobile telephone number, IP address, etc.) via a MWS identifier field 608.

In some embodiments, the recipient 104 (via the recipient server(s) 114) may receive the personal information from the MWS 102 at the operation 312 and then populate the appropriate fields of the payment page 600 that correspond to the payment type. In this way, the user 110 may be able to verify that the received information is correct and inputted into the appropriate fields presented in the payment page 600. Optionally, the user 110 may modify/edit some of the payment information prior submitting the payment information, such as via a continue button 610.

Figure 7:
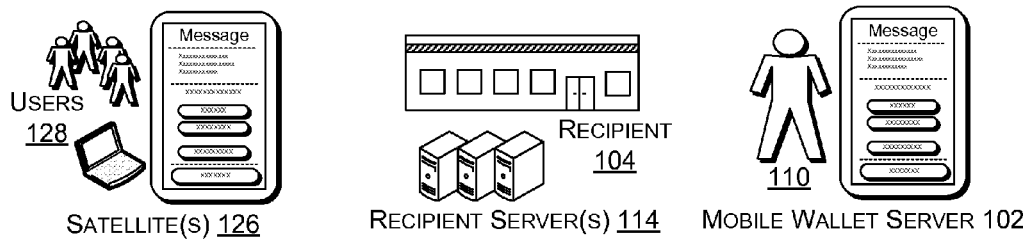
FIG. 7 is a flow diagram of an illustrative process to approve a request from a satellite's interaction with a recipient.
Figure 7:
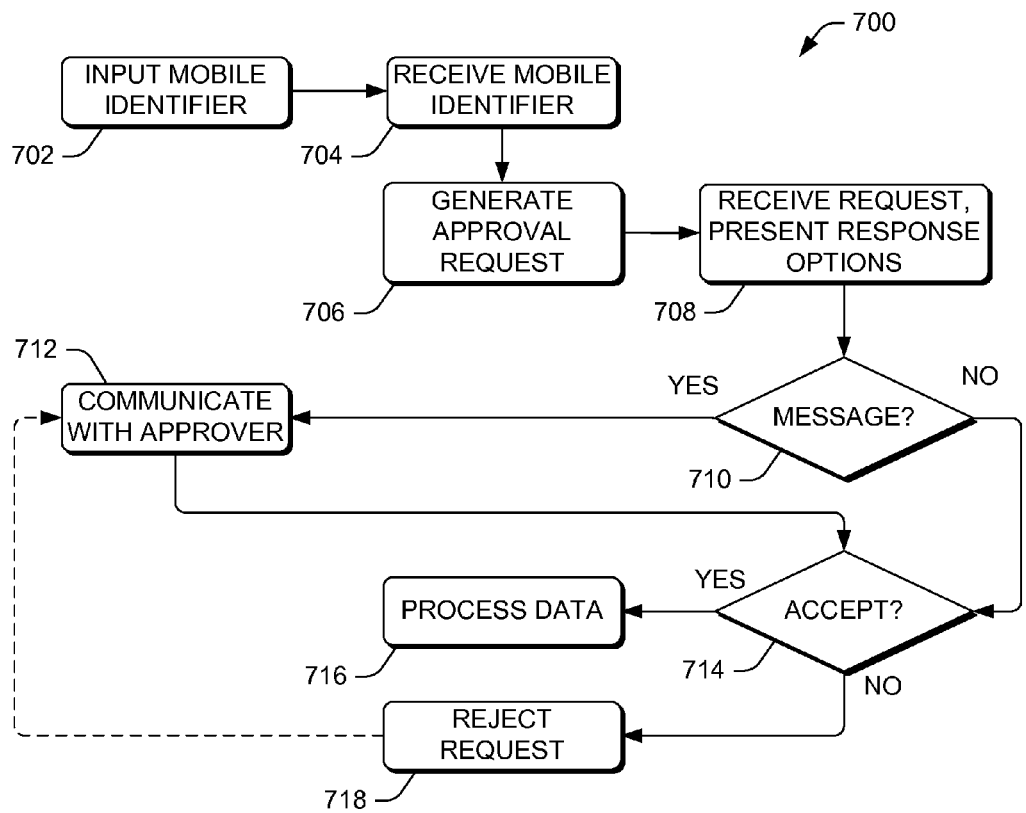

FIG. 7 is a flow diagram of an illustrative process 700 to approve a request from a satellite's interaction with a recipient. The process 700 is organized to depict the entity that is most likely to participate in the described operation. The order in which the operations are described is not intended to be construed as a limitation, and any number of the described blocks can be combined in any order and/or in parallel to implement the process 700.

At 702, the users 128 may input the MWS identifier 432 (via the satellites 126). The MWS identifier 432 may identify the MWS 102, which may include personal information requested by the users 128. For example, the users 128 may include a child of the user 110. The parent (user 110) may allow the child to make a purchase (or otherwise access/distribute personal information of the parent that is stored in the wallet 108) upon approval by the parent. In some embodiments, the users 128 may input a mobile identifier corresponding to one of the satellites 126 at the operation 702. In this situation, the satellites 126 may reroute the recipient 104 to connect to the MWS 102.

At 704, the recipient server(s) 114 may receive the MWS identifier 432 from the satellites 126. In some embodiments, the recipient server(s) may convert the MWS identifier from a first type (e.g., a telephone number) to a second type (e.g., an IP address), and so forth to enable real-time communication with the MWS 102.

At 706, the recipient server(s) 114 may generate an approval request for transmission to the MWS 102. The approval request may include the type of request (payment, username/password, contact information, etc.), information about the recipient (name, location, etc.), and/or other relevant data. The approval request may provide information to the request presenter 212 to enable the user 110 to make an informed decision regarding the request.

At 708, the MWS 102 may receive a request and present response options. The request presenter 212 may indicate that the request was generated by the users 128 via the satellites 126, which may assist the user 110 in determining a response to the request.

At 710, the user 110 may decide, via the MWS 102, whether to contact the users 128 that inputted the MWS identifier 432 at the operation 702. For example, the user 110 may decide to inquire about further details of the request generated at the operation 706, or for other reasons. When the user 110 decides to initiate a messaging with the users 128, the process 700 may enable the user 110 to communicate with the users 128 at 712. For example, the MWS 102 may message with the satellites 126 via the voice-based communication module 422 and/or the text-based communication module 424. In some embodiments, the MWS 102 may connect with the satellites 126 following a selection by the user 110 to reject the request received at the operation 708.

At 714, the user 110 may accept the request received at the operation 708, such as by selecting information in the UI 210 from the wallet presenter 214 and selecting an approve button, or other appropriate comment. When the user 110 approves the request, the recipient 104 may then process the received personal data from the MWS 102. However, when the user 110 rejects the request at 714, the recipient 104 may then relay the rejection to the users 128 at 718. As discussed above, a rejection at 718 may also optionally initiate a communication between the users 128 and the user 110 at the operation 712.

Figure 8:
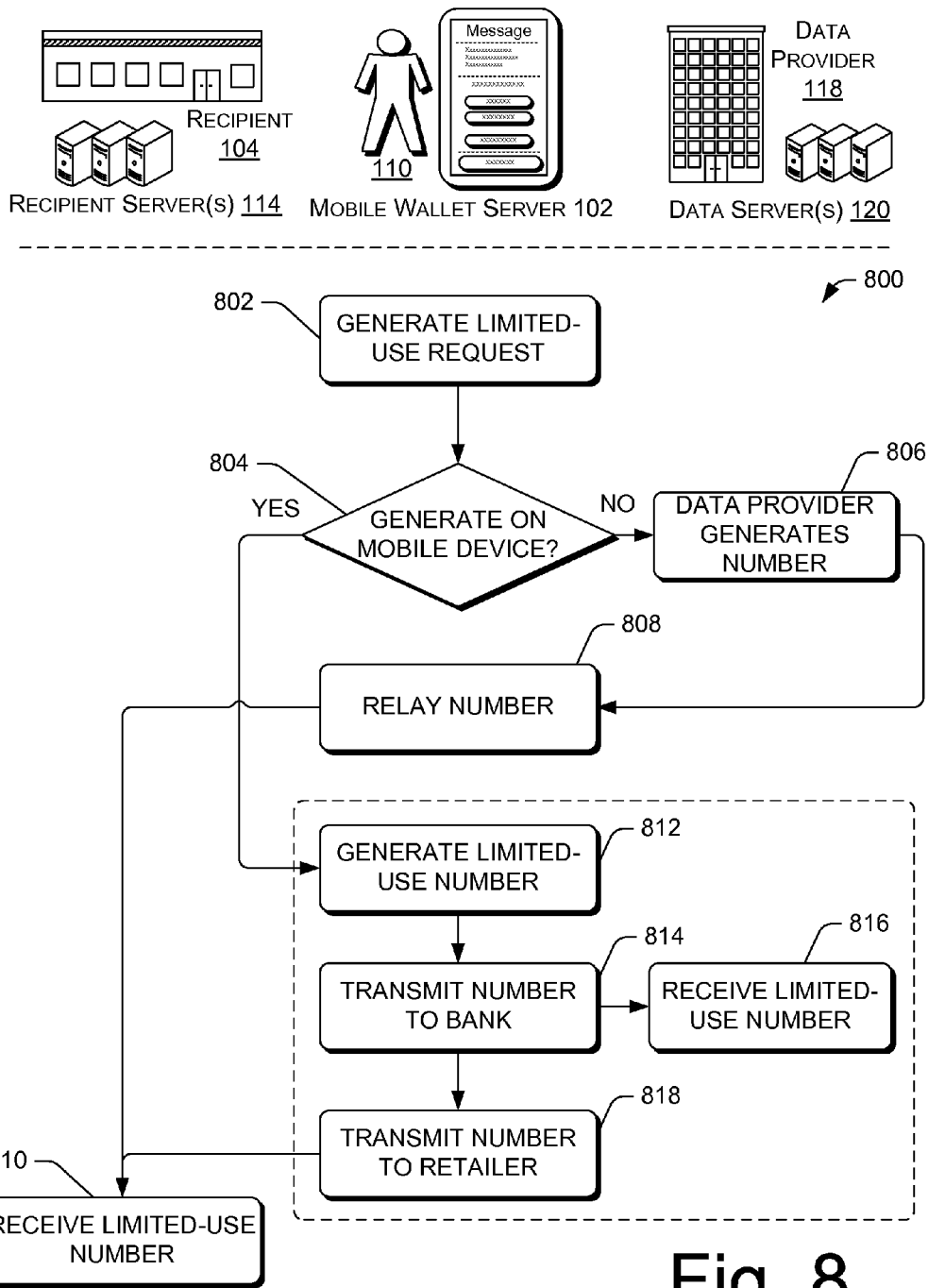
FIG. 8 is a flow diagram of an illustrative process to provide limited-use payment information to a recipient.

FIG. 8 is a flow diagram of an illustrative process 800 to provide limited-use payment information to a recipient. Again, the process 800 is organized to depict a few of many entities that may participate in the described operation and the order of operations is not intended to be construed as a limitation.

At 802, a limited-use payment request may be initiated by the user 110 via the MWS 102. In some embodiments, the user 110 may selectively initiate the limited-use payment request. A limited-use payment may be a one-time use (or other number of uses) payment number for a payment account that may expire after a redemption limit is reached. In some embodiments, the limited-use may expire after a predetermined duration of time (time limit). The user 110 may generate a limited-use number for a payment card stored in the wallet 108. In this way, if the limited-use number is intercepted by a third party during transmission between the MWS 102 and the recipient 104, or any other intended party (e.g., the users 128, the data provider 118, etc.), the user's exposure to fraudulent use of the payment card may be minimized because the limited-use number may have expired (been used up already) or may be near expiration.

At 804, the MWS 102 may determine whether the limited-use number is generated using the MWS via the wallet 108 ("yes" route), or by receiving a limited-use number from the data provider 118 ("no" route). It is contemplated that the MWS 102 may, in some embodiments, be limited to processing via only one of the routes ("yes" or "no") from the operation at 804.

At 806, the data provider 118 may generate the limited-use number, which may be relayed to the MWS 102 at 808, and ultimately provided to the recipient 104 for receipt at 810. In some embodiments, the communications involving the limited-use number may be encrypted by the encryption module 430. The limited-use number may be provided to the MWS 102 for storage in the wallet 108 prior to a request for personal/payment information by an entity. For example, the data provider 118 may provide limited-use numbers to the MWS 102 during an "off-line" update to enable the MWS to have limited use numbers on reserve for future use.

In some embodiments, the MWS may generate the limited-use number following the "yes" route from the operation 804 using the payment manager 414. The limited-use number may be generated using a number generating algorithm. In some instances the number generating algorithm may create a number that is predicable by the data provider 118, such that the data provider can create the number using the same algorithm.

At 812, the MWS 102 may generate the limited-use number. At 814, the MWS 102 may transmit the limited-use number to the data provider 118, which may then enable redemption of the limited use number from a redeemer such as the recipient 104. At 818, the MWS 102 may transmit the limited-use number to the recipient 104, who may receive the limited-use number at the operation 810.

Figure 9:
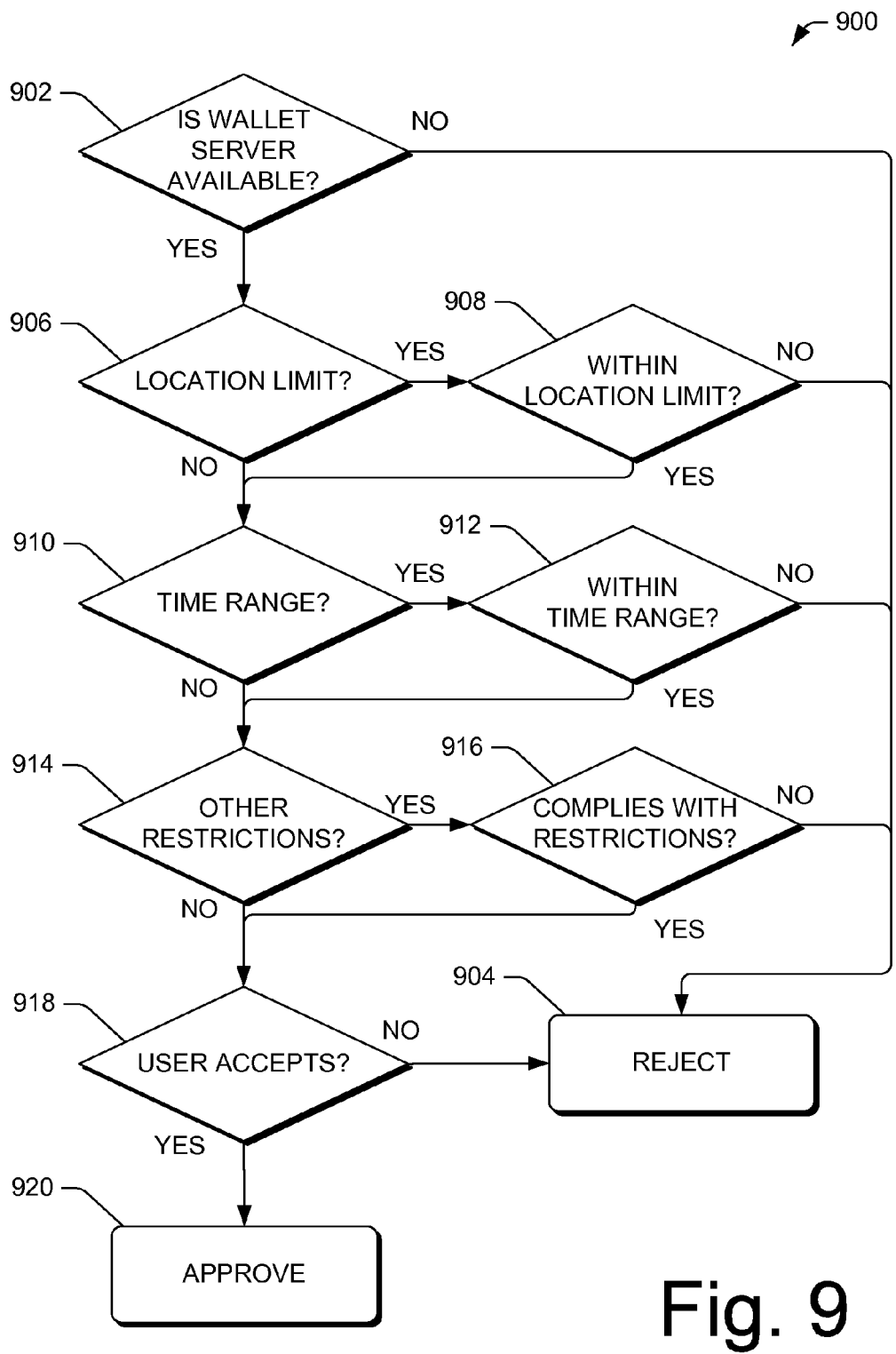
FIG. 9 is a flow diagram of an illustrative process to activate the mobile wallet server.

FIG. 9 is a flow diagram of an illustrative process 900 to activate the MWS 102. At 902, the MWS 102 and/or the wallet 108 may be made available by the user 110. For example, the wallet 108 may be turned on or otherwise made available for use such that the wallet is listening for a request from the recipient 104 or another entity. In addition or in the alternative, the MWS 102 may be powered on to make the wallet 108 available (e.g., executing an application that runs the wallet). When the MWS 102 (or the wallet 108) is not available, a request that is transmitted to the MWS 102 may be rejected at 904, or otherwise left unfulfilled.

At 906, the MWS 102 may determine whether a location limit is used to prevent communications of personal information in the wallet 108 with a requesting entity (e.g., the recipient 104). If so, at 908, the MWS 102 may determine whether a location limit is satisfied. For example, a location limit may prevent transmission of information in the wallet 108 to a recipient outside of location limit. In some instances, the location limit may be a geographic boundary (e.g., a state, city, zip code, radius, etc.). When the location limit is not satisfied (outside of limit), then a request may be rejected at 904.

At 910, the MWS 102 may determine whether a time range is used to prevent communications of personal information in the wallet 108 with a requesting entity (e.g., the recipient 104). If so, at 912, the MWS 102 may determine whether a time range is satisfied. For example, a time range may be established when the user 110 desires to be able to receive requests for personal information from the wallet 108. Requests made outside of the time range may be rejected at 904 without further activity by the user 110, such as to prevent annoyance and/or fraudulent access of personal information in the wallet 108.

At 914, additional restrictions may be imposed on use of the wallet 108 and/or the MWS 102. If other restrictions are used at 914, compliance may be determined at 916, which may reject a request at 904 when compliance is not attained. For example, one of the additional restrictions may determine whether funds are available to complete a requested payment authorization. In another example, a request limit may be imposed as an additional restriction at the operation 914. It is contemplated that other additional restrictions may be implemented in the operation 914.

At 918, the user may decide whether to accept a request. If the user decides to reject the request, the request is rejected at 904. If the user accepts or approves the request, the request is approved at 920. At 920, personal information from the wallet may be transmitted to the requesting entity (e.g., the recipient 104).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that, when executed on one or more processors, causes the one or more processors to perform acts comprising:
    receiving a request for personal information from an entity, the request directed to an identifier of a mobile wallet server (MWS) that establishes a real-time communication link between the entity and the MWS;
    determining whether a location of the MWS is within an approved location;
    in response to the location of the MWS being within the approved location:
        receiving a selection of personal information in the MWS used to store the personal information;
        receiving a selection of either an approval of the request or a rejection of the request; and
        transmitting at least a portion of the selected personal information to the entity via the real-time communication link in response to the received selection indicating the approval; and
    in response to the location of the MWS not being within the approved location, terminating the real-time communication link between the entity and the MWS.

2. The one or more non-transitory computer-readable media as recited in claim 1, wherein the acts further comprise terminating the real-time communication link with the entity when the received selection is the rejection or after the transmission of personal information to the entity.

3. The one or more non-transitory computer-readable media as recited in claim 1, wherein the received request is initiated by an input of the identifier in a data form of a page hosted by the entity, the input transmitted to the entity via an application executed by the MWS.

4. The one or more non-transitory computer-readable media as recited in claim 1, wherein the acts further comprise, prior to the receiving the request for the personal information, listening for the request while operating in a standby mode.

5. The one or more non-transitory computer-readable media as recited in claim 1, wherein the received selection of personal information is a selection of a unique identifier that is transmitted by the MWS to the entity computing device in lieu of a username and password, the unique identifier to be registered with the entity and associated with the username and password to enable a user access to a restricted resource of the entity upon receipt of the unique identifier.

6. The one or more non-transitory computer-readable media as recited in claim 1, wherein the real-time communication link further enables a secondary messaging between the entity and a user operating the MWS via at least one of a voice over internet protocol (VoIP) or a real-time text-based messaging protocol, the secondary messaging to facilitate ad hoc communications between the entity and the user.

7. The one or more non-transitory computer-readable media as recited in claim 1, wherein the personal information includes payment information and contact information.

8. The one or more non-transitory computer-readable media as recited in claim 1, wherein the acts further comprise:
    identifying selectable information within the personal information that conforms to a type of information requested by the entity; and
    presenting the selectable information via the MWS wallet server to enable the receiving the selection of the personal information from the selectable information.

9. The one or more non-transitory computer-readable media as recited in claim 1, wherein the acts further comprise determining whether a time of day of the receipt of the request is within an approved time period, and terminating the real-time communication link with the entity in response to determining that the time of day of the receipt of the request is not within the approved time period.

10. A method comprising:
    receiving a request for personal information from an entity, the request directed to an identifier of a mobile wallet server (MWS) that establishes a real-time communication link between the entity and the MWS;
    determining whether a location of the MWS is within an approved location;
    in response to the location of the MWS being within the approved location:
        receiving a selection of at least a portion of the personal information stored in the MWS;
        receiving a selection of either an approval of the request or a rejection of the request; and
        transmitting the at least the portion of the personal information selected to the entity via the real-time communication link in response to the received selection indicating the approval of the request; and
    in response to the location of the MWS not being within the approved location, terminating the real-time communication link between the entity and the MWS.

11. The method as recited in claim 10, further comprising terminating the real-time communication link with the entity in response to the received selection indicating the rejection of the request or after the transmission of the at least the portion of the personal information to the entity.

12. The method as recited in claim 10, wherein the received request is initiated by an input of the identifier in a data form of a page hosted by the entity, the input transmitted to the entity via an application executed by the MWS.

13. The method as recited in claim 10, further comprising, prior to the receiving the request for the personal information, listening for the request while operating in a standby mode.

14. The method as recited in claim 10, wherein the received selection of the at least the portion of the personal information is a selection of a unique identifier that is transmitted by the MWS to an entity computing device in lieu of a username and password, the unique identifier to be registered with the entity and associated with the username and password to enable a user access to a restricted resource of the entity upon receipt of the unique identifier.

15. The method as recited in claim 10, wherein the real-time communication link further enables a secondary messaging between the entity and a user operating the MWS via at least one of a voice over internet protocol (VoIP) or a real-time text-based messaging protocol, the secondary messaging to facilitate ad hoc communications between the entity and the user.

16. The method as recited in claim 10, wherein the personal information includes payment information and contact information.

17. The method as recited in claim 10, further comprising:
   identifying selectable information within the personal information that conforms to a type of information requested by the entity; and
   presenting the selectable information via the MWS to enable the receiving the selection of the at least the portion of the personal information from the selectable information.

18. The method as recited in claim 10, further comprising determining whether a time of day of the receipt of the request is within an approved time period, and terminating the real-time communication link with the entity in response to determining that the time of day of the receipt of the request is not within the approved time period.

19. A system comprising:
   one or more processors; and
   one or more non-transitory computer-readable media storing computer-executable instructions that, when executed, cause the one or more processors to perform operations comprising:
   in response to receiving a request for personal information from an entity at a mobile wallet server (MWS), establishing a real-time communication link between the entity and the MWS;
   determining whether a location of the MWS is within an approved location;
   in response to the location of the MWS being within the approved location, providing at least a portion of the personal information stored in the MWS to the entity via the real-time communication link in response to receiving a selection of the at least the portion of the personal information and receiving a selection of either an approval of the request; and
   in response to the location of the MWS not being within the approved location, terminating the real-time communication link between the entity and the MWS.

20. The system as recited in claim 19, wherein the operations further comprise:
   determining whether a time of day of the receipt of the request is within an approved time period; and
   terminating the real-time communication link with the entity in response to determining that the time of day of the receipt of the request is not within the approved time period.

* * * * *

UNITED STATES PATENT AND TRADEMARK OFFICE
CERTIFICATE OF CORRECTION

| | | |
|---|---|---|
| PATENT NO. | : 8,744,966 B1 | Page 1 of 1 |
| APPLICATION NO. | : 13/829070 | |
| DATED | : June 3, 2014 | |
| INVENTOR(S) | : Amacker et al. | |

It is certified that error appears in the above-identified patent and that said Letters Patent is hereby corrected as shown below:

In the Claims

Column 16, line 12, claim 19, delete "information and receiving a selection of either an" and insert -- information and receiving a selection of an --.

Signed and Sealed this
Twelfth Day of August, 2014

Michelle K. Lee
*Deputy Director of the United States Patent and Trademark Office*